United States Patent Office 2,902,408
Patented Sept. 1, 1959

2,902,408

SUSPENSIONS OF DRUGS DESTINED FOR INJECTION AND PROCESS FOR THE PREPARATION THEREOF

Jan Bouman, Jan Daniël Herman Homan, and René Sieders, all of Oss, Netherlands, assignors to Organon Inc., Orange, N.J., a corporation of New Jersey No Drawing. Application July 15, 1958
Serial No. 748,583

Claims priority, application Netherlands
September 12, 1957

10 Claims. (Cl. 167—82)

For a long time efforts have been directed toward giving drugs a prolonged action, especially when they are destined for parenteral administration. The present invention relates to a process for the preparation of suspensions of drugs destined for injection, which suspensions have a prolonged action. A prolonged action is especially of great significance:

a. In the case of drugs that are eliminated so rapidly that a very frequent administration is necessary to maintain a sufficiently high level in the blood and the tissues;

b. In the case of drugs that have to be applied for a long time at a stretch including the whole further life;

c. In the case of drugs that are very costly; the fact is that it has appeared that a prolongation of the action of a preparation often has as a result that to reach the same effect a slighter quantity of the medicament will suffice.

Several methods are known to obtain a prolonged action. These methods may be divided into five groups:

(1) *Physiological influencing of the resorption and the excretion.*—In this way a longer action can be obtained by administering a preparation for example intramuscularly instead of intravenously. Further the resorption of the drug can be retarded by adding to it, on intramuscular injection, a vasoconstrictor, such as adrenaline.

(2) *Changing the solvent.*—When for example a drug is soluble both in water and in oil, the oily solution turns out to have a more prolonged activity than the solution in water. Further the action of a medicament can be prolonged by adding to the solution substances that have a retarding effect on the resorption, such as gelatin and dextranes.

(3) *Chemical change of the drug.*—Sometimes a prolonged activity can be obtained by converting a drug into a derivative thereof which has for example a slighter solubility or is less rapidly excreted.

(4) *The creation of a depot in the body by means of implantation.*—With this method a compact quantity of the drug is brought into the body by means of a small surgical performance. The drugs that are administered in this manner have to be in a nearly water insoluble form. A water-soluble compound is also rapidly absorbed by the body from the compact tablet.

(5) *Application of suspensions.*—When a drug is injected in a suspension form and not as a solution one may in general reckon with a more prolonged action. Such suspensions can be prepared by choosing a medium in which the drug is only sparingly soluble or by converting the drug into a sparingly water-soluble derivative.

As examples of such suspensions are mentioned oily suspensions of adrenaline, heparin, and penicillin and aqueous suspensions of sparingly soluble insulin compounds.

It is known that the duration of the action of crystal suspensions of hormones, such as oestradiol and extra zinc-containing insulin, is dependent upon the size of the suspended crystals. Consequently, on preparing long-acting crystal suspensions the duration of action can be controlled by the choice of the size of particles. For this purpose crystals are prepared of a definite size of particles or large crystals are crushed to this size.

This principle—controlling the duration of action by choosing a definite size of particles—could so far only be made use of with medicines that can be prepared in a crystalline form.

Now a process was found for the preparation of long-acting suspensions of drugs, characterized in that a solid drug preparation is compressed after which of the resulting solid body, divided into small particles, a suspension is prepared in a suitable medium.

By applying the process of the invention the surface per unit by weight of the drug is strongly minimized, as a result of which the dissolving rate decreases. The result is that after injection a smaller quantity of the drug per time unit is made available than after injection of a preparation containing the drug in a less compressed form.

The present process is of special importance for the preparation of suspensions of drugs which cannot be prepared in a crystalline form. However, the process can also be applied to preparations which can be obtained in a crystal form indeed. In general the process will not present special advantages in cases where crystals of the desired size can easily be prepared of the drug; however, it gives considerable advantages in cases where the preparation of suitable crystals of the drug in question presents difficulties or requires special experience or special knowledge.

According to the process of the invention it is in principle possible to reduce the rate of dissolving of any drug that consists of very fine particles and in this manner give that drug a prolonged activity. It will be clear, however, that the rate of dissolving of readily water-soluble drugs in the body is so great that the reduction of this rate of dissolving gives no noticeable results. It makes, for example, in many cases practically no difference whether a drug dissolves completely in two or in ten minutes. Consequently, application of the process as such to drugs which are readily soluble under physiological conditions has no advantages. With such preparations special measures will have to be taken which will be discussed hereinafter.

So the process according to the invention is of special importance for the preparation of suspension of drugs which are poorly soluble under physiological conditions. As examples of such drugs are to be mentioned protein hormones, for example the adrenocorticotropic hormone, the thyrotropic hormone, gonadotropic hormones, and glucagon, especially when these hormones are combined with certain quantities of zinc, and further poorly soluble combinations of substances, such as heparin-butacaine, penicillin-procaine, ACTH-protamine zinc, and the like.

So the great advantage of the present process is that suspensions can be prepared which have a more prolonged activity than the known suspensions.

Another advantage is that one is in a position to obtain various types of action by changing the distribution of the size of particles, this distribution determining the type of action of the preparation. By seeing, during the preparation, to the presence of very fine particles, preparations are obtained which may also exert a direct effect in addition to the desired prolonged effect.

After compressing, the compressed product is divided into particles, the size of which is chosen such that the desired duration of action is obtained. Theoretically these sizes of particles can have all possible values. Practically it serves no purpose to make the particles very small because then there is no longer a strongly prolonged activity in regard to the starting product; nor may the particles be made so large that difficulties present themselves on injection. The maximal particle size useful for practice lies at about 250 microns; still larger particles are difficult to maintain in a suspended form and injections of suspensions with particles larger than 250 microns require very thick injection needles. A size of particles in the range of from 1–100 microns has appeared to be very suitable. With this size a properly prolonged activity is obtained; while on injection no or no material objections will present themselves.

Since the injection of suspension of some drugs may involve painfulness, it is recommendable to add in those cases a small quantity of a local anaesthetic, such as procaine and xylocaine.

With the process of the invention start is made from a solid preparation. In most of the cases use will be made of an air dry preparation. However, it is also possible to start from an entirely anhydrous preparation.

The preparation is compressed to a glassy solid body under a pressure which is dependent on the starting product but which should at least amount to 2,500 kg./cm.² With preparations of protein hormones a pressure of 5,000 kg./cm.² will in general give excellent glassy solids. With products such as heparin-butacaine and penicillin-procaine a pressure of for example 10,000 kg./cm.² will give very favourable results. The resulting solid body can be sterilized in a simple manner, for example by means of ionizing rays, such as X-rays.

The compressed product may be divided in any desired manner until the desired size of particles has been obtained.

The compressed product may first be sterilized and then be ground to the desired fineness for example in a ball mill in a sterile isotonic solution. Of course it is also possible to divide the product into small particles of the desired sizes in a dry condition, for example by grinding, and suspend it subsequently, if necessary after sieving, in the desired medium.

As a suspension medium is to be considered any medium that is suitable to be injected and in which the drug does not or very sparingly dissolve. The most frequently applied media are aqueous. In order to prolong the action of aqueous suspensions still further, substances with a resorption retarding effect may be added to them, such as gelatin and dextranes. At the same time suspension stabilisers may be added to the suspensions, for which purpose use may likewise be made of dextranes or of other higher molecular polysaccharides.

In cases where the action of the starting product is dependent on the presence of certain substances which are present in the suspension medium in solution, such substances will also have to be present in the medium in which the compressed and ground product is suspended. The prolonged action for example of suspensions of certain biologically active proteins is dependent on the total metal content in the suspension. One should therefore see to it that on preparing a suspension of such a compressed and ground drug an adequate quantity of the metals in question is present in the liquid.

Consequently the present process as such can advantageously be applied to medicines that are sparingly soluble under physiological conditions or have been brought in a sparingly soluble form; also with soluble preparations a fairly prolonged activity can be obtained with the present process after applying some special manipulation. Here the drug is not compressed as such, but is first mixed with a compound which is sparingly soluble in the tissue fluids and then the thus obtained mixture is compressed. Mixing is preferably carried out in such a manner that the drug is precipitated from a solution on or simultaneously with the chosen insoluble compound. After separating the thus obtained precipitate the latter is dried and compressed to a solid body. As sparingly soluble vehicles are to be considered i.a. zinc phosphate, calcium phosphate, and aluminum phosphate. The drug may also be adsorbed on a sparingly soluble vehicle or may be allowed to form a complex compound with it.

The mixing of drugs with vehicles which are sparingly soluble in the tissue fluids is not restricted to water-soluble drugs but may also be applied to sparingly soluble substances. For example the activity of the known suspensions of testosterone adsorbed on aluminum phosphate can still further be prolonged by subjecting the adsorbate to the present process. As examples of drugs which can be compressed together with a sparingly soluble vehicle are to be mentioned vitamin $B_{12}$, heparin, atropine derivatives, and substances with action on the central nervous system.

Although the process is of special importance for the preparation of aqueous suspensions, it is not restricted to same. It is also possible to suspend the compressed products after for example grinding in other media suitable for injection, such as arachis oil. This will especially be done in those cases where the drug in question is not stable in an aqueous medium or is resorbed therefrom too rapidly.

In the case of drugs that are not stable in aqueous suspension or the physical condition of which in aqueous medium is not stable (for example on account of the particles growing or on account of the soluble drug being dissolved, during storage, from the pressed insoluble vehicle by the suspension agent), it is recommendable to suspend the dry powder in the suspension medium a short time before the injection. A suspension may also first be prepared of the powder and lyophilized. In most of the cases the suspension medium will be marketed in a separate ampoule together with the lyophilized suspension or the ground dry powder.

The process according to the invention is especially of importance for the preparation of additional zinc-containing suspensions of amorphous insulin.

These suspensions have a duration of action which is prolonged in regard to that of corresponding suspensions of amorphous insulin not compressed according to the invention.

An advantage of the use of the present process in the last mentioned case is that preparations can be produced with an action corresponding to that of additional zinc-containing suspensions of crystalline insulin, viz. starting from amorphous insulin. As a result of this it is not necessary to make use of complicated and time-consuming crystallization techniques; but start may be made from the more readily obtainable amorphous product.

The following examples illustrate the invention; it is self-evident that the invention is not restricted to the drugs given in the examples, but can be applied to a large number of injectable drugs. The known measures to obtain sterile preparations have naturally been observed with the processes described in the examples.

EXAMPLE I

*Heparin-butacaine complex*

To a 2 percent aqueous heparin solution is added so much of a solution containing 30 percent by weight of butacaine sulphate that on further addition no precipitate is formed any longer. The formed precipitate is centrifuged, washed until no sulphate can be demonstrated in the wash water any longer, and finally dried with acetone. Per quantity by weight of heparin the precipitate contains about two quantities by weight of butacaine. The precipitate is compressed under a pressure of 12,000 kg./cm.² By grinding and sieving the thus obtained compressed plate is divided into particles which have a size of from 50–75 microns. The thus obtained powder is suspended in arachis oil to which 2 percent by weight of aluminium stearate have been added.

In this manner a stable injectable suspension with strongly prolonged action is obtained.

EXAMPLE II

Glucagon

A suspension is prepared of the following composition:

|  | Milligrams |
|---|---|
| Glucagon | 3,500 |
| Zinc (as zinc acetate) | 1,400 |
| Glacial acetic acid | 29,750 |
| Hydrochloric acid | 500 |
| Nipagin | 3,500 |

Sodium hydroxide solution to pH 7.1.
Distilled water to 3,500 ml.

The precipitate is separated and dried. It is then compressed to a glassy body under a pressure of 7,000 kg./cm.² After grinding and sieving to a particle size of from 5–40 microns the thus obtained powder is suspended again in the clear mother-liquor of the original suspension.

EXAMPLE III

Insulin

At a pressure of about 5,000 kg./cm.² in high vacuum amorphous insulin powder with a zinc content of 1.8 percent by weight is compressed for 30 seconds. The resulting solid is rubbed fine in a mortar under exposure to ultraviolet light. The resulting powder is suspended in a sterile solution containing 0.008 percent by weight of zinc as chloride, 0.9 percent by weight of sodium chloride and 0.1 percent by weight of nipagin. Then some more of the said sterile solution is added until a suspension is obtained which contains per ml. 40 units of insulin. This suspension has a prolonged action.

EXAMPLE IV

Insulin

An isotonic aqueous suspension of amorphous insulin is prepared containing, in addition to a preservative, 1.5 mg. of glycocol per ml. and 700 µg. of zinc per 100 units of insulin. From one litre of this suspension the precipitate is removed by centrifugation. The mother-liquor is stored. The precipitate is washed with respectively 300 ml. of dry acetone and 200 ml. of ether. After drying on the air 1.68 g. of amorphous insulin is obtained with an enhanced zinc content and a moisture content of about 9 percent by weight. In vacuum and at a pressure of 15,000 kg./cm.² 150 mg. of this insulin are compressed to a glassy solid with a specific gravity of 1.24 g./ml. 2 ml. of the above mother-liquor are poured upon the solid and the whole is ground in a micro ball mill for 3 hours. The resulting suspension is diluted to 88 ml. with the mother-liquor. The resulting suspension contains 40 units of insulin per ml., while the size of particles amounts to from about 1 to about 20µ. The suspension has a prolonged action which is greater than that of the suspension from which start was made.

EXAMPLE V

Insulin

As starting product is used a suspension of a coupling product of insulin with salmine. This suspension has the following composition per ml.:

| Insulin | units | 40 |
|---|---|---|
| Salmine sulphate | µg | 200 |
| Glycerol | mg | 16 |
| Meta cresol | mg | 1.6 |
| Phenol | mg | 0.65 |
| Sec. sodium phosphate | mg | 2 |
| Zinc | µg | 12 |
| Water | ml | 1 |
| pH |  | 7.25 |

The precipitate is removed from the suspension in the manner of Example IV, subsequently compressed to a solid body at a pressure of 2,500 kg./cm.² and then ground in the original mother-liquor. This time grinding until a size of particles of from about 1 to about 30µ. The preparation has both direct and prolonged actions.

EXAMPLE VI

Insulin glucagon

A suspension of the following composition:

| Insulin | 200,00 I.U. |
|---|---|
| Glucagon | 4,000 mg. |
| Zinc (as zinc chloride 0 aq.) | 2,000 mg. |
| Glacial acetic acid | 42,500 mg. |
| Hydrochloric acid | 720 mg. |
| Nipagin | 5,000 mg. |

Sodium hydroxide solution to pH 7.2.
Distilled water to 5,000 ml.

is processed, in the manner of Example II, to a suspension with particles of from 5–40 microns.

EXAMPLE VII

Adrenocorticotropic hormone

A suspension is prepared of the following composition:

| ACTH | 40 U.S.P. u./ml. |
|---|---|
| Zinc | 1.5 mg./ml. |
| Glycerol | 15 mg./ml. |
| Phenol | 5 mg./ml. |

Sodium hydroxide solution to pH 8.0.

The precipitate, containing the active constituent, is separated by centrifugation. The mother-liquor is stored. The separated precipitate is washed a few times with acetone and dried. It is subsequently compressed under a pressure of 14,800 kg./cm.² The resulting transparent brown plate is pulverized in a mortar and sieved through a sieve with a size of the meshes of 53 microns. Then the powder is suspended in the above mother-liquor.

EXAMPLE VIII

Adrenocorticotropic hormone

The suspension which is used as starting product for the preparation of an extremely strongly long-acting ACTH preparation has the following composition:

| ACTH | 20 U.S.P. u./ml. |
|---|---|
| Zinc | 1.5 mg./ml. |
| Tertiary sodium phosphate | 2.5 mg./ml. |
| Glycerol | 15 mg./ml. |
| Phenol | 5 mg./ml. |

Sodium hydroxide solution to pH 6.0.

By means of centrifugation the precipitate is separated from the suspension and dried after washing with acetone. Subsequently it is pressed under a pressure of 5,000 kg./cm.² The thus obtained plate is pulverized and sieved through a sieve with a size of the meshes of 53 microns and subsequently suspended in the mother-liguor of the original suspension.

EXAMPLE IX

Lipoic acid 1 g. of lipoic acid (as sodium salt) is mixed very intimately with 3 g. of calcium phosphate. A hard solid body is pressed of the mixture under a pressure of 15,000 kg./cm.² This is ground while dry and sieved to a size of particles of from 40–60 microns. The thus obtained powder is dispensed in ampoules in such a manner that each ampoule contains 200 mg. of the powder. For injection an isotonic liquid is added to the ampoule as a result of which an injectable suspension is obtained after shaking.

EXAMPLE X

Thyrotropic hormone

From a suspension of the following composition:

Thyrotropic hormone _____ u./ml__ 5
Zinc (as zinc chloride) _____ mg./ml__ 2
Phenol _____ mg./ml__ 5
Glycerol _____ mg./ml__ 20
Sodium hydroxide solution to pH 7.5.

the precipitate is separted by centrifugation. The precipitate is dried with acetone, after which it is compressed under a pressure of 7,000 kg./cm.$^2$. The thus obtained hard plate is broken to pieces and brought in the mother-liquor which has been obtained by centrifuging the suspension. The pieces are ground in the mother-liquor by means of a ball mill until a suspension has been obtained with an average size of particles of 40 microns.

EXAMPLE XI

Antidiuretic hormone 100 mg. of a powder obtained by extracting posterior lobes of hog pituitaries which contains 500 antidiuretic units, is compressed under a pressure of 5,000 kg./cm.$^2$. The thus obtained plate is ground and sieved through a sieve with a size of the meshes of 40 microns. The thus obtained powder is suspended in 100 ml. of arachis oil. The thus obtained suspension contains 5 antidiuretic units per ml.

EXAMPLE XII

Testosterone 10 g. of testosterone are dissolved in 100 ml. of ethanol. This solution is added to 200 ml. of an aqueous suspension of 2 g. of aluminum phosphate. The precipitate is separated and, after drying, pressed at a pressure of 15,000 kg./cm.$^2$. The compressed material is ground and sieved to a size of the particles of on an average 30 microns and subsequently suspended in an isotonic liquid in such a manner that the suspension contains 25 mg. of testosterone per ml.

EXAMPLE XIII

Penicillin procaine

An intensively stirred mixture of equal parts by weight of penicillin and procaine (free base) is compressed under a pressure of 10,000 kg./cm.$^2$. The compressed piece is ground and sieved to obtain particles with sizes of from 10–60 microns. Of the thus obtained powder an injectable suspension is obtained by mixing with an isotonic liquid.

EXAMPLE XIV

Heparin 120 parts by weight of herparin (activity 140 I.U./mg.) and 80 parts by weight of very finely crystalline tricalcium phosphate are mixed intensively, after which the mixture is compressed under a pressure of 7,000 kg./cm.$^2$. The hard pressed piece is ground in a ball mill until a size of the particles of from 5–20 microns.

The powder is packed in an ampoule. By mixing it right before injection with an aqueous solvent containing 2.5% glycerol and 0.1% nipagin an injectable suspension is obtained.

EXAMPLE XV

Vitamin $B_{12}$ 1 part by weight of vitamin $B_{12}$ is mixed very intensively with 100 parts by weight of calcium phosphate. The mixture is compressed under a pressure of 10,000 kg./cm.$^2$, after which the compressed piece is divided into particles, by grinding and sieving, of sizes of on an average 40 microns. This powder is dispensed in ampoules under sterile conditions. Each ampoule contains 100 mg. of the powder. By adding, a short time before the injection, a sterile isotonic aqueous liquid to the powder and shaking it therewith, an injectable suspension of vitamin $B_{12}$ is obtained.

In the same manner a preparation is obtained containing the same amount of vitamin $B_{12}$-tannate instead of vitamin $B_{12}$.

EXAMPLE XVI

Atropinetannate 100 mg. of atropinetannate are mixed intimately with 4 g. of very finely divided tricalcium phosphate. The mixture is compressed under a pressure of about 10,000 kg./cm.$^2$. The compressed piece is ground and sieved to a size of the particles of from 20–60 microns. The powder is suspended in an isotonic liquid and that in such a manner that 1 ml. of the resulting suspension contains 1 mg. of atropinetannate.

We claim:

1. A pharmaceutical preparation destined for injection consisting of a suspension of an injectable drug in a parenterally applicable non-toxic liquid carrier in which said drug is substantially insoluble, the suspended particles of said suspension having been prepared by compressing the drug in question at a pressure of at least 2,500 kg./cm.$^2$ to a solid body and subdividing said solid body in particles the maximum size of which amounts to 250 microns.

2. A pharmaceutical preparation according to claim 1 in which said drug is an insulin compound which is substantially insoluble in the body fluids.

3. A pharmaceutical preparation destined for injection consisting of a suspension of an injectable drug in a parenterally applicable non-toxic liquid carrier in which said drug is substantially insoluble, the suspended particles of said suspension having been prepared by mixing said drug with a pharmaceutically acceptable non-toxic solid carrier, which is substantially insoluble in the body fluids, compressing the thus obtained mixture at a pressure of at least 2,500 kg./cm.$^2$ to a solid body and subdividing said solid body in particles the maximum size of which amounts to 250 microns.

4. A pharmaceutical preparation according to claim 3 in which said solid carrier is tricalciumphosphate.

5. A pharmaceutical preparation of a drug destined for injection consisting of a substantially dry powder which before the injection is to be suspended in a parenterally applicable non-toxic liquid carrier, said powder having been prepared by compressing at a pressure of at least 2,500 kg./cm.$^2$ a substance chosen from the group consisting of said drug and a mixture of said drug and a pharmaceutically acceptable non-toxic solid carrier, substantially insoluble in the body fluids, to a solid body and subdividing said solid body in particles the maximum size of which amounts to 250 microns.

6. A prolonged action therapeutic preparation suitable for injection comprising a suspension of fine particles of a highly compressed solid injectable drug preparation in a parenterally applicable liquid carrier in which said drug preparation is substantially insoluble, the particle size of said drug preparation ranging from about 1 to about 250 microns.

7. A prolonged action therapeutic preparation suitable for injection comprising a suspension of fine particles of a highly compressed solid injectable drug preparation in a parenterally applicable liquid carrier in which said drug preparation is substantially insoluble, said drug preparation comprising a mixture of an injectable drug and a pharmaceutically acceptable nontoxic solid carrier which is substantially insoluble in the body fluids, and having a particle size ranging from about 1 to about 250 microns.

8. Method for the production of a prolonged action therapeutic preparation suitable for injection which comprises compressing a solid injectable drug preparation at a pressure of at least 2500 kg. per sq. cm., subdividing the compressed drug preparation into particles having a maximum particle size of about 250 microns, and suspending said particles in a parenterally applicable nontoxic liquid carrier in which the drug preparation is substantially insoluble.

9. Method for the production of a prolonged action therapeutic preparation suitable for injection which comprises compressing a solid injectable drug preparation comprising a mixture of an injectable drug and a pharmaceutically acceptable nontoxic solid carrier which is substantially insoluble in the body fluids at a pressure of at least 2500 kg. per sq. cm., subdividing the compressed drug preparation into particles having a maximum particle size of about 250 microns, and suspending said particles in a parenterally applicable nontoxic liquid carrier in which the drug preparation is substantially insoluble.

10. The method of claim 9 in which the solid carrier is a metal phosphate.

References Cited in the file of this patent

UNITED STATES PATENTS

| | | |
|---|---|---|
| 2,491,537 | Welch | Dec. 20, 1949 |
| 2,661,315 | Jurist | Dec. 1, 1953 |
| 2,669,537 | Thompson | Feb. 16, 1954 |
| 2,757,124 | Wolff | July 31, 1956 |

UNITED STATES PATENT OFFICE
CERTIFICATE OF CORRECTION

Patent No. 2,902,408                               September 1, 1959

Jan Bouman et al

It is hereby certified that error appears in the printed specification of the above numbered patent requiring correction and that the said Letters Patent should read as corrected below.

Column 6, line 10, Example VI, for:

Insulin -------- 200,00 I.U.

read

Insulin -------- 200,000 I.U.

Signed and sealed this 5th day of April 1960.

(SEAL)

Attest:

KARL H. AXLINE
Attesting Officer

ROBERT C. WATSON
Commissioner of Patents